US011948706B2

(12) United States Patent
Gundel

(10) Patent No.: US 11,948,706 B2
(45) Date of Patent: Apr. 2, 2024

(54) UNIVERSAL MICROREPLICATED DIELECTRIC INSULATION FOR ELECTRICAL CABLES

(71) Applicant: 3M INNOVATIVE PROPERTIES COMPANY, St. Paul, MN (US)

(72) Inventor: Douglas B. Gundel, Cedar Park, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 520 days.

(21) Appl. No.: 17/259,871

(22) PCT Filed: Jul. 15, 2019

(86) PCT No.: PCT/IB2019/056029
§ 371 (c)(1),
(2) Date: Jan. 12, 2021

(87) PCT Pub. No.: WO2020/016751
PCT Pub. Date: Jan. 23, 2020

(65) Prior Publication Data

US 2021/0343449 A1 Nov. 4, 2021

Related U.S. Application Data

(60) Provisional application No. 62/700,404, filed on Jul. 19, 2018.

(51) Int. Cl.
*H01B 7/08* (2006.01)

(52) U.S. Cl.
CPC .................................. *H01B 7/0838* (2013.01)

(58) Field of Classification Search
CPC .................................................... H01B 7/0838
See application file for complete search history.

(56) References Cited

U.S. PATENT DOCUMENTS 5,286,924 A * 2/1994 Loder .................. H01B 7/0233
174/117 F
9,701,798 B2 * 7/2017 Zalamea Bustillo ..... B32B 3/20
(Continued)

FOREIGN PATENT DOCUMENTS

| | | |
|---|---|---|
| JP | 05211396 | 8/1993 |
| WO | WO 2012-030364 | 3/2012 |

(Continued)

OTHER PUBLICATIONS

International Search Report for PCT International Application No. PCT/IB2019/056029, dated Dec. 5, 2019, 5 pages.

*Primary Examiner* — William H. Mayo, III
*Assistant Examiner* — Rhadames Alonzo Miller
(74) *Attorney, Agent, or Firm* — Jonathan L. Tolstedt

(57) ABSTRACT

A ribbon cable is described, including a first insulative layer extending along a length and a width of the cable, and a plurality of spaced apart substantially parallel conductors extending along the length of the cable. The insulative layer has opposing top and bottom major surfaces and defines a plurality of spaced apart cavities extending between the top and bottom major surfaces of the first insulative layer. The top major surface of the first insulative layer is deformed in a plurality of spaced apart substantially parallel regions extending along the length, and arranged along the width, of the cable. Each deformed region has a shape of a groove and includes a deformed portion of at least one cavity in the plurality of cavities. Each conductor is disposed within a corresponding deformed region of the insulative layer.

18 Claims, 12 Drawing Sheets

(56) References Cited

U.S. PATENT DOCUMENTS

| | | | | |
|---|---|---|---|---|
| 10,964,448 | B1 * | 3/2021 | Wright | H01B 3/421 |
| 2013/0146326 | A1 * | 6/2013 | Gundel | H01B 11/005 174/102 R |
| 2015/0294760 | A1 * | 10/2015 | Gundel | H01B 11/002 174/102 R |
| 2017/0276891 | A1 * | 9/2017 | Esseghir | G02B 6/4433 |
| 2018/0075948 | A1 * | 3/2018 | Kobayashi | H01B 11/20 |
| 2019/0096542 | A1 * | 3/2019 | Huang | H01B 7/0838 |
| 2019/0198199 | A1 * | 6/2019 | Gundel | H01B 11/203 |
| 2020/0185124 | A1 * | 6/2020 | Yang | H01B 7/0861 |

FOREIGN PATENT DOCUMENTS

| | | |
|---|---|---|
| WO | WO 2012-138717 | 10/2012 |
| WO | WO 2012-138729 | 10/2012 |
| WO | WO 2016-099909 | 6/2016 |
| WO | WO 2017-160478 | 9/2017 |
| WO | WO 2020-035773 | 2/2020 |

* cited by examiner

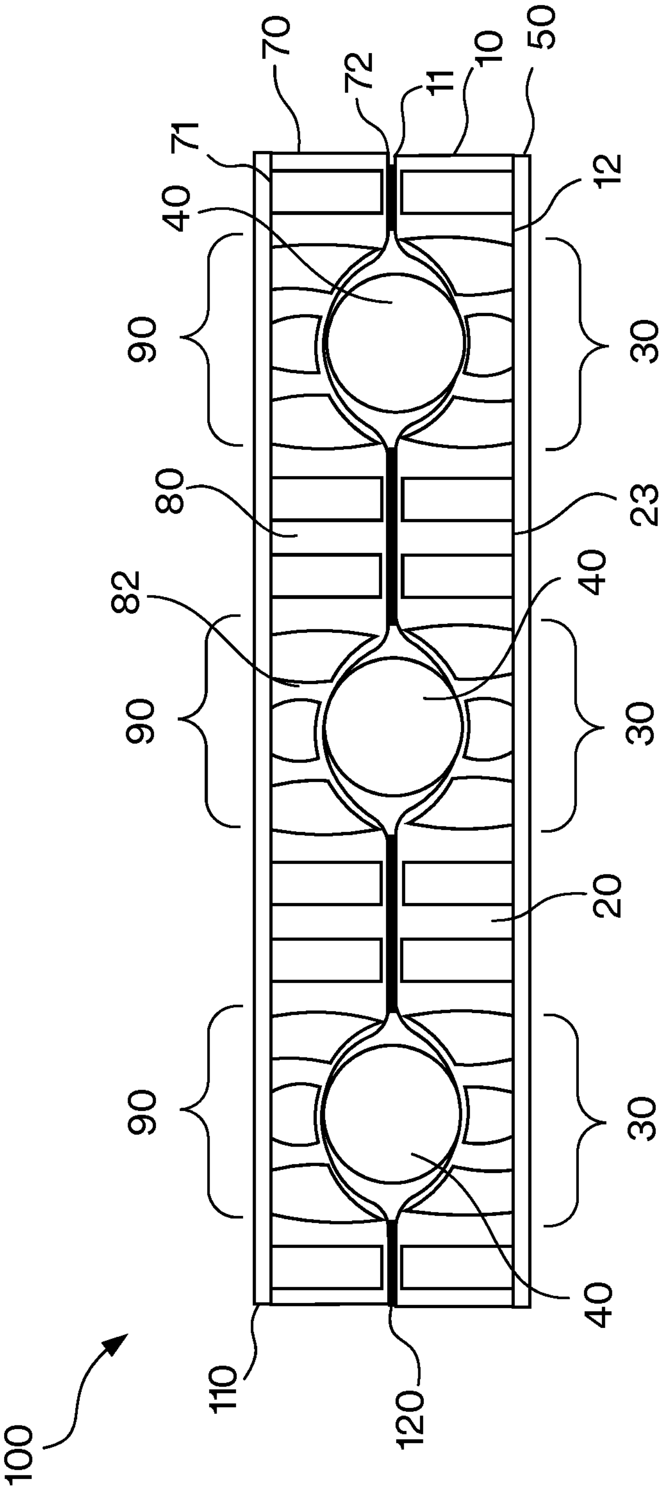
FIG. 4
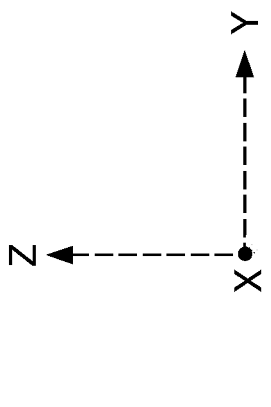

UNIVERSAL MICROREPLICATED DIELECTRIC INSULATION FOR ELECTRICAL CABLES

BACKGROUND

Electrical cables for transmission of electrical signals are well known. One common type of electrical cable is a coaxial cable. Coaxial cables generally include an electrically conductive wire surrounded by an insulating material. The wire and insulator are surrounded by a shield, and the wire, insulator, and shield are surrounded by a jacket. Another common type of electrical cable is a shielded electrical cable that includes one or more insulated signal conductors surrounded by a shielding layer formed, for example, by a metal foil.

SUMMARY

In some aspects of the present description, a ribbon cable is provided, including a first insulative layer extending along a length and a width of the cable, and a plurality of spaced apart substantially parallel conductors extending along the length of the cable. The first insulative layer includes opposing top and bottom major surfaces and defines a plurality of spaced apart cavities therein extending between the top and bottom major surfaces of the first insulative layer. The top major surface of the first insulative layer is deformed in a plurality of spaced apart substantially parallel regions extending along the length, and arranged along the width, of the cable. Each deformed region has a shape of a groove and includes a deformed portion of at least one cavity in the plurality of cavities. Each conductor is disposed in a corresponding deformed region of the insulative layer.

In some aspects of the present description, a ribbon cable is provided, including an insulative layer extending along a length and a width of the cable, and a plurality of conductors extending along the length of the cable. A plurality of spaced apart, substantially parallel grooves is formed in a top major surface of the insulative layer and extending along the length, and are arranged along the width of the cable. The insulative layer exhibits higher mass densities in regions below and aligned with the grooves and lower mass densities in regions mid-way between adjacent grooves. Each of the plurality of conductors is disposed in a corresponding groove in the plurality of grooves.

In some aspects of the present description, a ribbon cable is provided, including an insulative layer extending along a length and a width of the cable, and a plurality of uninsulated conductors. The insulative layer includes a first regular structure formed in a top major surface of the insulative layer and extending along the length and width of the cable, and a plurality of spaced apart substantially parallel grooves formed in the top major surface by deforming at least portions of the first regular structure. Each of the uninsulated conductors is disposed in a corresponding groove in the plurality of grooves.

In some aspects of the present description, a ribbon cable is provided, including a first insulative layer extending along a length and a width of the cable, a second insulative layer disposed on and substantially co-extensive with the first insulative layer, and a plurality of spaced apart substantially parallel conductors extending along the length of the cable. The first insulative layer includes opposing top and bottom major surfaces and defines a plurality of spaced apart cavities therein extending between the top and bottom major surfaces of the first insulative layer. The top major surface of the first insulative layer is deformed in a plurality of spaced apart substantially parallel regions extending along the length, and arranged along the width, of the cable. Each deformed region has a shape of a groove and includes a deformed portion of at least one cavity in the plurality of cavities.

The second insulative layer includes opposing top and bottom major surfaces, the bottom major surface of the second insulative layer facing the top major surface of the first insulative layer. The second insulative layer defines a plurality of spaced apart cavities therein extending between the top and bottom major surfaces of the second insulative layer. The bottom major surface of the second insulative layer is deformed in a plurality of spaced apart substantially parallel regions extending along the length, and arranged along the width, of the cable. Corresponding deformed regions of the first and second insulative layers are aligned and registered with each other, and each deformed region of the second insulative layer has a shape of a groove and includes a deformed portion of at least one cavity in the plurality of cavities. Each conductor in the plurality of spaced apart substantially parallel conductors is disposed in corresponding deformed regions of the first and second insulative layers.

BRIEF DESCRIPTION OF THE DRAWINGS

FIG. 4 is a cross-sectional view of a ribbon cable;

DETAILED DESCRIPTION

Figure 1:
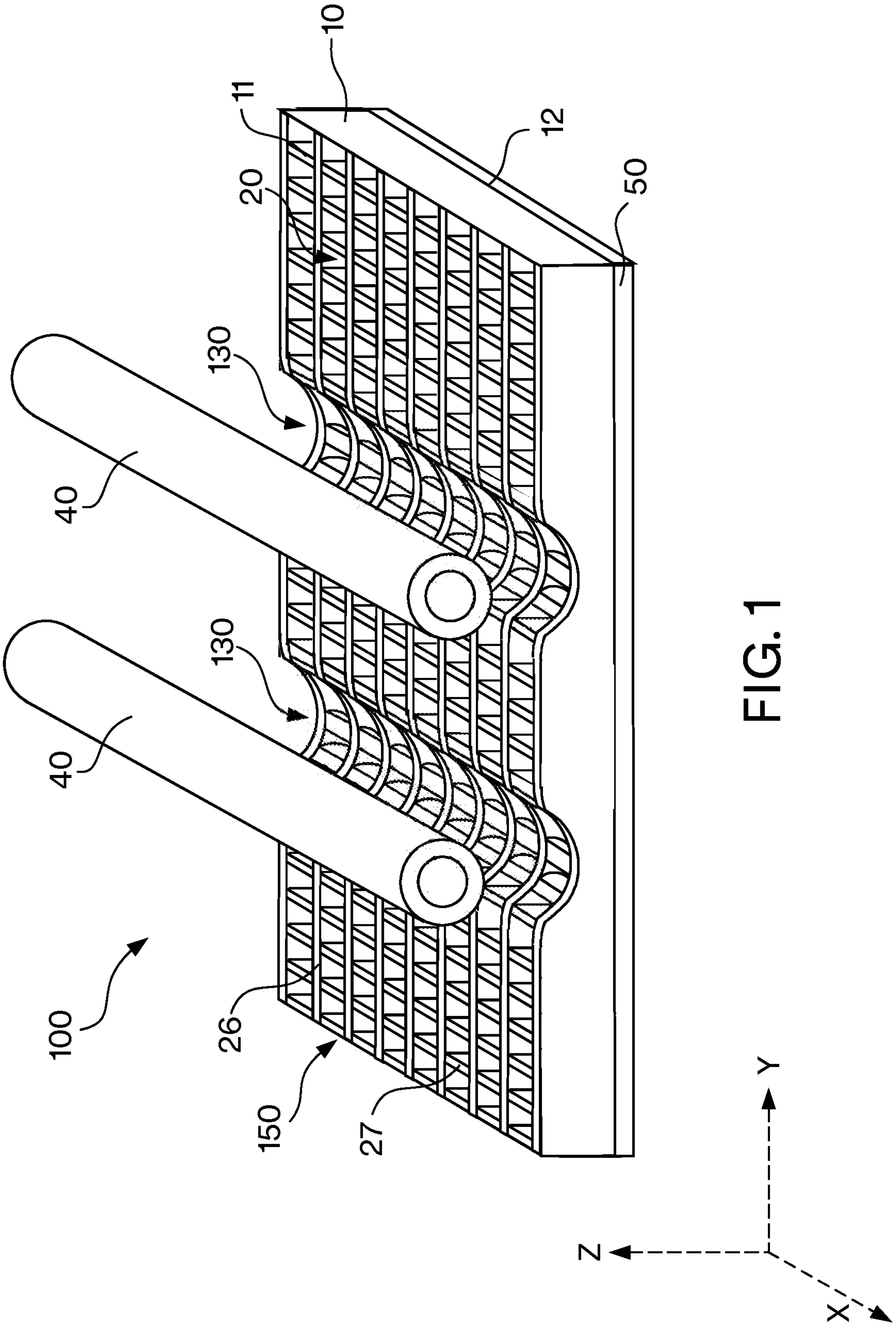
FIG. 1 is an exploded view of a ribbon cable.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to some aspects of the present description, electrical cables incorporating the layers and structures described herein have been found to provide improved performance over conventional cables. For example, the electrical cables may have one or more of a reduced impedance variation along the cable length, lower skew, lower propagation delay, lower insertion loss, increased crush resistance, reduced cable size, increased conductor density, and improved bend performance compared to conventional cables. In addition, manufacturing processes for the construction of electrical cables such as those described herein have been found to simplified and/or more cost effective when compared to manufacturing processes used in the production of conventional cables.

In some embodiments, an electrical ribbon cable is constructed by creating a universal, microreplicated film with a pattern of structured air voids, modifying the film to create a secondary structure on one or both sides of the film, and using the structured microreplicated film to construct a ribbon cable. In some embodiments, the film is a self-supporting, insulating, flat sheet of thermoplastic containing a repeating pattern of air voids, such that the film has a high air content. The insulating film may be modified through machining, heat-forming, and/or embossing to create secondary structures, which may include grooves or channels to hold conductors, contours in the shape of the ribbon cable, pinch points, or any other appropriate secondary structure. The microreplicated film may be created as a universal substrate which can be used in various designs without the need for expensive design-specific tooling. Relatively simple processes may be used to create secondary structures in the microreplicated film to fit a specific cable design. For example, the film may be deformed through heat-forming and/or embossing to contain substantially parallel grooves that run the length of the ribbon cable. Once the grooves are formed, conductors may be placed in the grooves for the length of the ribbon cable. In some embodiments, a second microreplicated film with a matching groove pattern may be placed on top of the first film to sandwich the conductors, creating a formed ribbon cable.

For the purposes of this specification, microreplication shall refer to the process of replicating a pattern of microscale structures onto a substrate. In some embodiments, the microscale structures may be precisely-sculpted microscopic shapes placed on a substrate or backing layer to form cells or air voids. In other embodiments, the microscale structures may be molded or formed into an insulative layer using microreplication techniques and/or micromolds to create the cells or air voids.

In some embodiments, a process for creating a ribbon cable involves using microreplication techniques to form universal insulative films exhibiting high air content, forming deformed areas in the film creating substantially parallel channels or grooves along a length of at least one surface of the film, aligning conductors with the grooves of a top and bottom insulative film, and pressing the top and bottom films together, sandwiching the conductors in the aligned grooves, to create the finished ribbon cable. In some embodiments, a conductive shield layer or shield film may be added to the side of each film opposite the grooves, such that the finished cable is substantially enclosed in a conductive shielding layer.

In some embodiments, both sides of an insulative film may be formed by various forming processes. For example, a forming process may create substantially parallel grooves in one side of the insulative film, while another forming process may create contouring features in the opposite side of the insulative film. The contouring features thus formed in the insulative film may form “cover” portions and “pinched” portions, such that the cover portions create a channel or pocket which substantially surrounds and contain one or more conductors, and the pinched portions are portions where first and second insulative layers are compressed flat and which may or may not contain conductors.

The insulative layer or film formed by the described processes may have a low dielectric constant and/or low dielectric loss (e.g., low effective loss tangent). For example, the pattern of microscale voids created in the insulative layer may have an air content of greater than 40%. In some embodiments, the insulative layer may have an effective dielectric constant of less than about 2, or less than about 1.7, or less than about 1.6, or less than about 1.5, or less than about 1.4, or less than about 1.3, or less than about 1.2. In some embodiments, an effective dielectric constant of a ribbon cable constructed in this manner for at least one pair of adjacent conductors driven with differential signals of equal amplitude and opposite polarities is less than about 2.5, or less than about 2.2, or less than about 2, or less than 1.7, or less than about 1.6, or less than about 1.5, or less than about 1.4, or less than about 1.3, or less than about 1.2.

The conductors used in the ribbon cable may include any suitable conductive material, such as an elemental metal or a metal alloy (e.g., copper or a copper alloy), and may have a variety of cross sectional shapes and sizes. For example, in cross section, the conductors may be circular, oval, rectangular or any other shape. One or more conductors in a cable may have one shape and/or size that differs from other one or more conductors in the cable. The conductors may be solid or stranded wires. All the conductors in a cable may be stranded, all may be solid, or some may be stranded and some solid. Stranded conductors and/or ground wires may take on different sizes and/or shapes. The conductors may be coated or plated with various metals and/or metallic materials, including gold, silver, tin, and/or other materials.

In some embodiments, an electrically conductive shield may be layered, wrapped, or otherwise placed around the insulative layers holding the conductors. The shield may include an electrically conductive shielding layer disposed on an electrically insulative substrate layer. In some embodiments, the shield may include a first shield disposed on a top side of the electrical cable and a second shield disposed on a bottom side of the electrical cable.

FIG. 1 is an exploded view of an exemplary ribbon cable disclosed herein. A ribbon cable 100 includes an insulative layer 10 extending along a length (e.g., in the x-direction of FIG. 1) and a width (e.g., in the y-direction of FIG. 1) of the cable, and a plurality of uninsulated conductors 40. The insulative layer 10 includes a first regular structure 150 formed in a top major surface 11 of the insulative layer 10 and extending along the length and width of the ribbon cable 100, and a plurality of spaced apart, substantially parallel grooves 130 formed in the top major surface 11 by deforming at least portions of the first regular structure 150. Each of the uninsulated conductors 40 is disposed in a corresponding groove 130 in the plurality of grooves 130. The insulative layer 10 defines a plurality of spaced apart cavities 20, which extend between the top 11 and bottom 12 major surfaces of the first insulative layer 10. In some embodiments, each cavity 20 is defined by a plurality of walls 26 and intersecting ribs 27. In some embodiments, at least one wall 26 or intersecting rib 27 is substantially parallel to the length or the width of the cable 100. In some embodiments, at least one wall 26 or intersecting rib 27 is oblique relative to the length or width of the cable 100. The orientation of walls 26 and intersecting ribs 27 may be reversed from that shown in FIG. 1, with walls 26 running substantially parallel to the length of the ribbon cable 100 (in the X direction of FIG. 1) and intersecting ribs 27 extending substantially perpendicular to the length of ribbon cable 100 (that is, extending in the Y direction.)

In some embodiments, the intersecting ribs 27 may be of a material different from that of the walls 26 formed by a separate process that that of the process forming the walls 26. In some embodiments, the intersecting ribs 27 are composed of the same material as the walls 26, and may be formed by the same process or by a separate process. In some embodiments, the ribbon cable 100 includes a substrate 50 (e.g., a backing film) disposed on the bottom major surface 12 of the first insulative layer 10. The walls 26 and intersecting ribs 27 may be substantially the same height in their undeformed state, or may be each of a different height. For example, intersecting ribs 27 may be shorter than walls 26, allowing them to provide support for walls 26 while still having an increased air content within ribbon cable 100. In some embodiments, intersecting ribs 27 may be substantially the same as walls 26 (that is, indistinguishable from walls 26 other than oriented differently).

Figure 2:
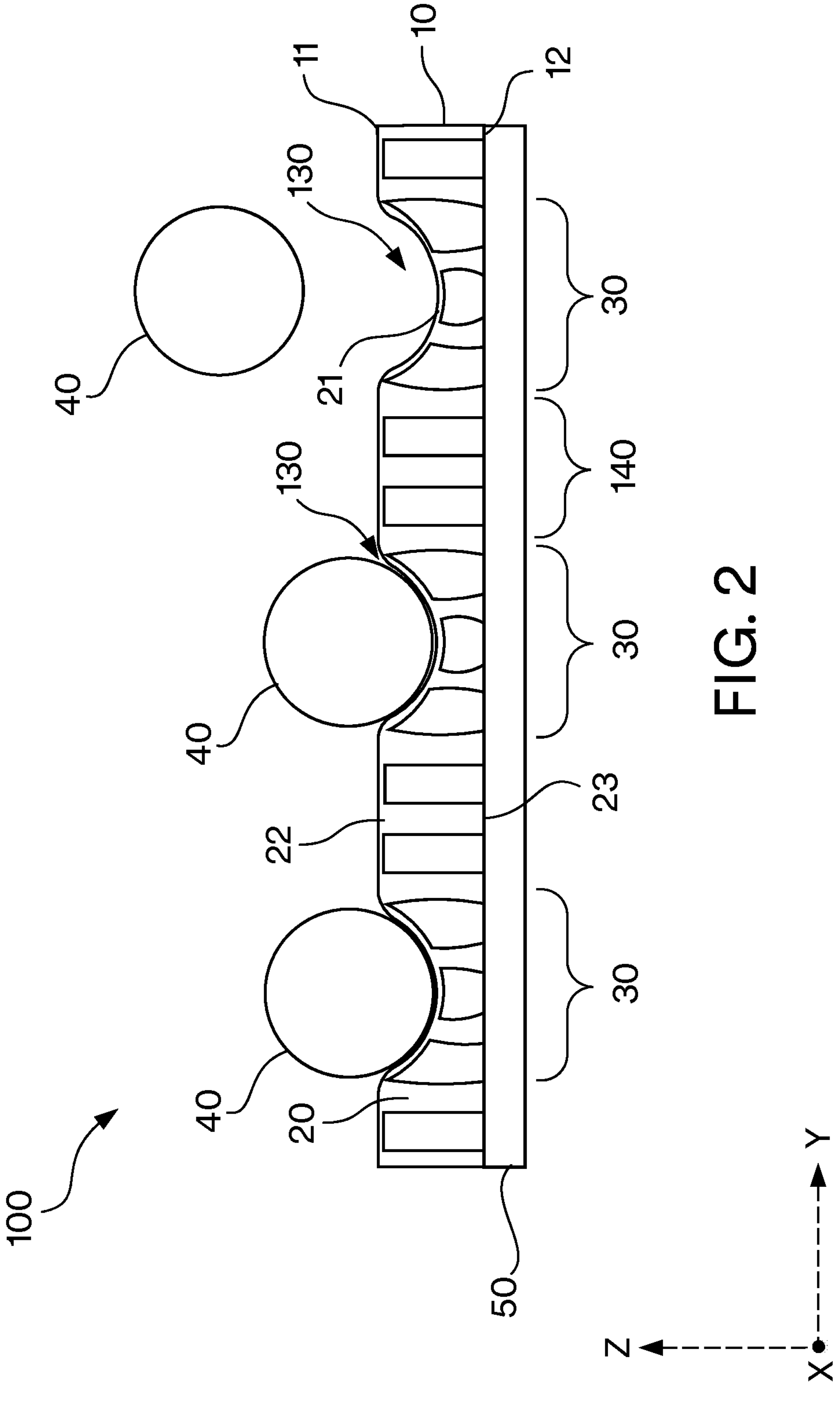
FIG. 2 is a cross-sectional view of a ribbon cable.

FIG. 2 is a cross-sectional view of a ribbon cable in accordance with an embodiment of the present description. A ribbon cable 100 includes a first insulative layer 10, and a plurality of spaced apart substantially parallel conductors 40. The first insulative layer 10 extends along a length (e.g., in the x-direction of FIG. 2, extending into the page) and a width (e.g., in the y-direction of FIG. 2) of the cable and includes opposing top 11 and bottom 12 major surfaces, and defines a plurality of spaced apart cavities 20 therein. The spaced apart cavities 20 extend between the top 11 and bottom 12 major surfaces of the first insulative layer 10. The top major surface 11 of the first insulative layer 10 is deformed in a plurality of spaced apart substantially parallel regions 30 extending along the length, and arranged along the width, of the ribbon cable 100. Each deformed region 30 has a shape of a groove 130 and is defined by a deformed portion 21 of at least one cavity in the plurality of cavities. In some embodiments, the shape of the groove 130 for each deformed region is generally cylindrical. The plurality of spaced apart, substantially parallel conductors 40 extends along the length of the cable, and each conductor is disposed in a corresponding deformed region 30 of the insulative layer 10. In some embodiments, each deformed region 30 includes a deformed portion of a sidewall (see 26, FIG. 1) of at least one cavity 20 in the plurality of spaced apart cavities 20

The plurality of spaced apart cavities 20 form a regular two-dimensional array of cavities 20 arranged along the length and width of the first insulative layer 10. In some embodiments, each cavity 20 includes a top open end 22 at the top surface 11 of the first insulative layer 10 and a bottom open end 23 at the bottom surface 12 of the first insulative layer 10. In some embodiments, the ribbon cable 100 includes a substrate 50 (e.g., a backing film) disposed on the bottom major surface 12 of the first insulative layer 10. In some embodiments, the bottom open end 23 may be "blind", that is, covered by and stopping at the substrate 50. In other embodiments, the substrate 50 may have openings substantially corresponding to the bottom open end 23 of each cavity 20, allowing the cavities 20 to be "through-holes" (i.e., open holes). In some embodiments, both the top end 22 and bottom end 23 of the cavities 20 may be closed (e.g., covered by additional insulative material). Examples of this are discussed elsewhere in this specification.

Turning back to FIG. 2, in some embodiments, a ribbon cable 100 includes an insulative layer 10 extending along a length and a width of the cable 100, a plurality of spaced apart substantially parallel grooves 130 formed in a top major surface 11 of the insulative layer 10 and extending along the length, and arranged along the width, of the cable 100, and a plurality of conductors 40 extending along the length of the cable, each conductor 40 disposed in a corresponding groove 130 in the plurality of grooves 130. The insulative layer 10 may include higher mass densities in regions 30 below and aligned with the grooves 130 and lower mass densities in regions 140 mid-way between adjacent grooves 130. The regions of higher mass density 30 may be created by deforming an area of lower mass density 140 to create a groove 130. This may be done by, for example, a heat forming process combined with embossing, although any appropriate deforming process may be used to create the areas of higher mass density 30.

Figure 3:
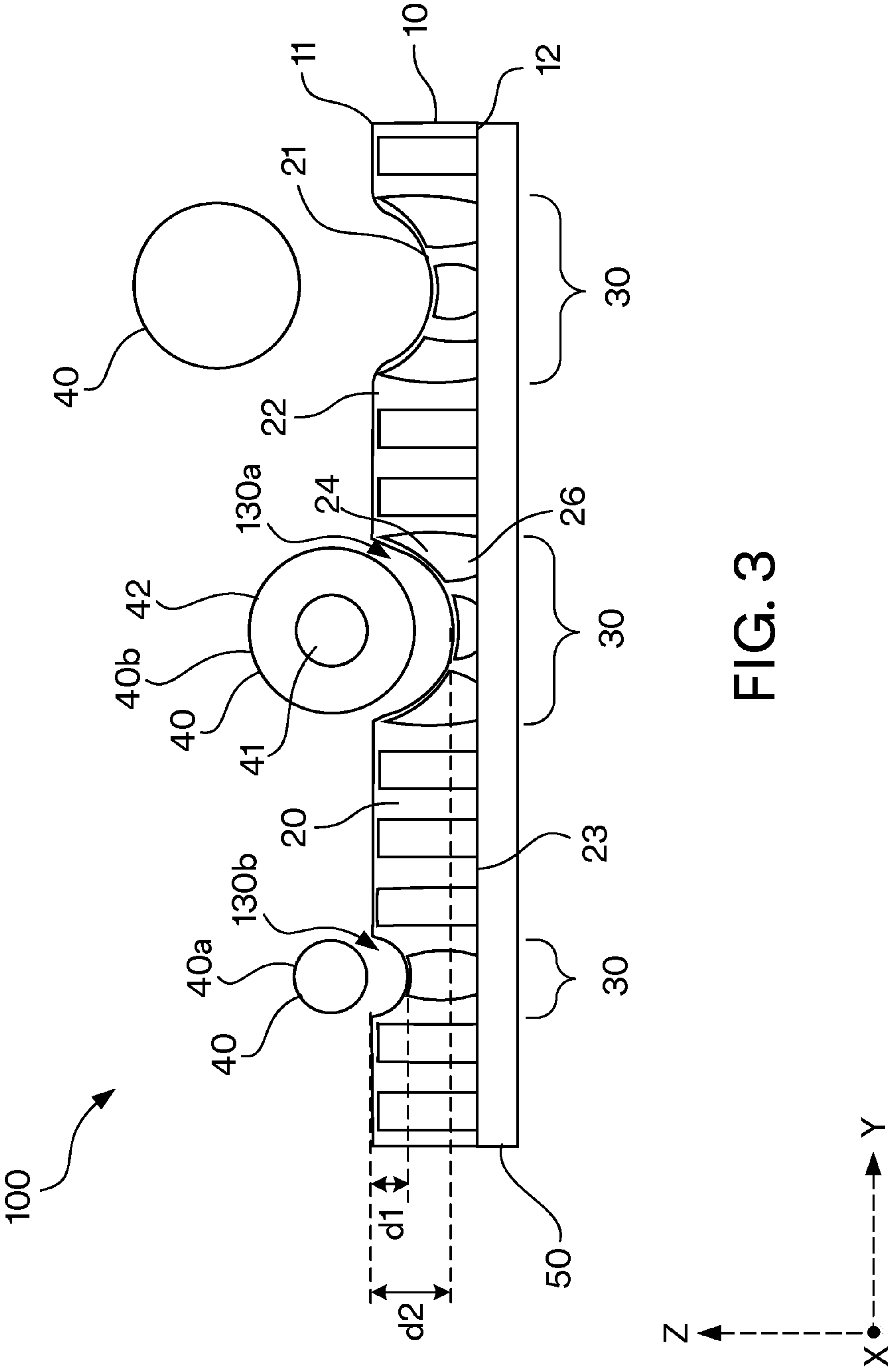
FIG. 3 is a cross-sectional view of a ribbon cable.

FIG. 3 is a cross-sectional view of a ribbon cable in accordance with an alternate embodiment disclosed herein. A ribbon cable 100 includes a first insulative layer 10, and a plurality of spaced apart substantially parallel conductors 40. The first insulative layer 10 extends along a length (e.g., in the x-direction of FIG. 3, extending into the page) and a width (e.g., in the y-direction of FIG. 3) of the cable and includes opposing top 11 and bottom 12 major surfaces, and defines a plurality of spaced apart cavities 20 therein. The spaced apart cavities 20 extend between the top 11 and bottom 12 major surfaces of the first insulative layer 10.

The top major surface 11 of the first insulative layer 10 is deformed in a plurality of spaced apart substantially parallel regions 30 extending along the length, and arranged along the width, of the ribbon cable 100. Each deformed region 30 has a shape of a groove 130 and is defined by a deformed portion 21 of at least one cavity in the plurality of cavities. The plurality of spaced apart, substantially parallel conductors 40 extends along the length of the cable, and each conductor is disposed in a corresponding deformed region 30 of the insulative layer 10. Each deformed region 30 includes a deformed portion 24 of a wall 26 of at least one cavity 20 in the plurality of cavities 20. Cavities 20 within the deformed region 30 may define less volume than cavities 20 outside of deformed regions 30. For example, a total volume of a deformed cavity 20 may be less than a total volume of an undeformed cavity 20 by no more than 70%. In another example, a total volume of a deformed cavity 20 may be less than a total volume of an undeformed cavity 20 by no more than 50%. In some embodiments, each deformed region 30 includes a deformed portion 24 of a sidewall 26 of at least one cavity 20 in the plurality of spaced apart cavities 20.

Electrical conductors such as conductors 40 may be insulated or uninsulated. Conductors may use insulation for a variety of purposes, including electrically isolating a conductor from another conductor or surface, protection against environmental threats (such as moisture), protection against physical damage, resisting electrical leakage, etc. In some embodiments of the ribbon cable 100, at least one conductor **40*a* in the plurality of spaced apart, substantially parallel conductors 40 is uninsulated. In some embodiments, at least one conductor 40*b* in the plurality of spaced apart, substantially parallel conductors 40 is insulated, with the conductor including a central conductor 41 surrounded by an insulative material 42**.

In some embodiments, at least one groove **130*a* extends deeper into the insulative layer (see, for example, dimension d2 in FIG. 3) and at least one other groove 130*b* extends shallower into the insulative layer (see dimension d1 in FIG. 3). This may be to support the inclusion of conductors 40 of differing sizes or to include both insulated and uninsulated conductors 40 within the same ribbon cable 100**.

FIG. 4 is a cross-sectional view of a ribbon cable in accordance with an embodiment of the present description, in which two insulative layers are used to substantially enclose a set of electrical conductors. A ribbon cable 100 includes a first insulative layer 10, a second insulative layer 70, and a plurality of spaced apart substantially parallel conductors 40. The first insulative layer 10 extends along a length (e.g., in the x-direction of FIG. 4, extending into the page) and a width (e.g., in the y-direction of FIG. 4) of the cable 100 and includes opposing top 11 and bottom 12 major surfaces, and defines a plurality of spaced apart cavities 20 therein. The spaced apart cavities 20 extend between the top 11 and bottom 12 major surfaces of the first insulative layer 10. The top major surface 11 of the first insulative layer 10 is deformed in a plurality of spaced apart substantially parallel regions 30 extending along the length, and arranged along the width, of the ribbon cable 100. Each deformed region 30 has a shape of a groove, and the plurality of spaced apart, substantially parallel conductors 40 extends along the length of the cable, and each conductor is disposed in a corresponding groove of insulative layer 10.

The second insulative layer 70 is disposed on and substantially co-extensive with the first insulative layer 10, and includes opposing top 71 and bottom 72 major surfaces, the bottom major surface 72 of the second insulative layer 70 faces the top major surface 11 of the first insulative layer 10. The second insulative layer 70 defines a plurality of spaced apart cavities 80 therein extending between the top 71 and bottom 72 major surfaces of the second insulative layer 70, the bottom major surface 72 of the second insulative layer 70 deformed in a plurality of spaced apart substantially parallel regions 90 extending along the length, and arranged along the width, of the cable 100. Corresponding deformed regions 30 and 90 of the first 10 and second 70 insulative layers, respectively, are aligned and registered with each other. Each deformed region 90 of the second insulative layer 70 has a shape of a groove and includes a deformed portion 82 of at least one cavity 80 in the plurality of cavities 80. Each conductor 40 in the plurality of spaced apart substantially parallel conductors 40 is disposed in corresponding deformed regions 30 and 90 of the first 10 and second 70 insulative layers, respectively.

In some embodiments, ribbon cable 100 includes a substrate 50 disposed on the bottom major surface 12 of the first insulative layer 10, and a substrate 110 disposed on the top major surface 71 of the second insulative layer 70. In some embodiments, an adhesive 120 is disposed between and bonding the first insulative layer 10 to the second insulative layer 70.

Figure 5:
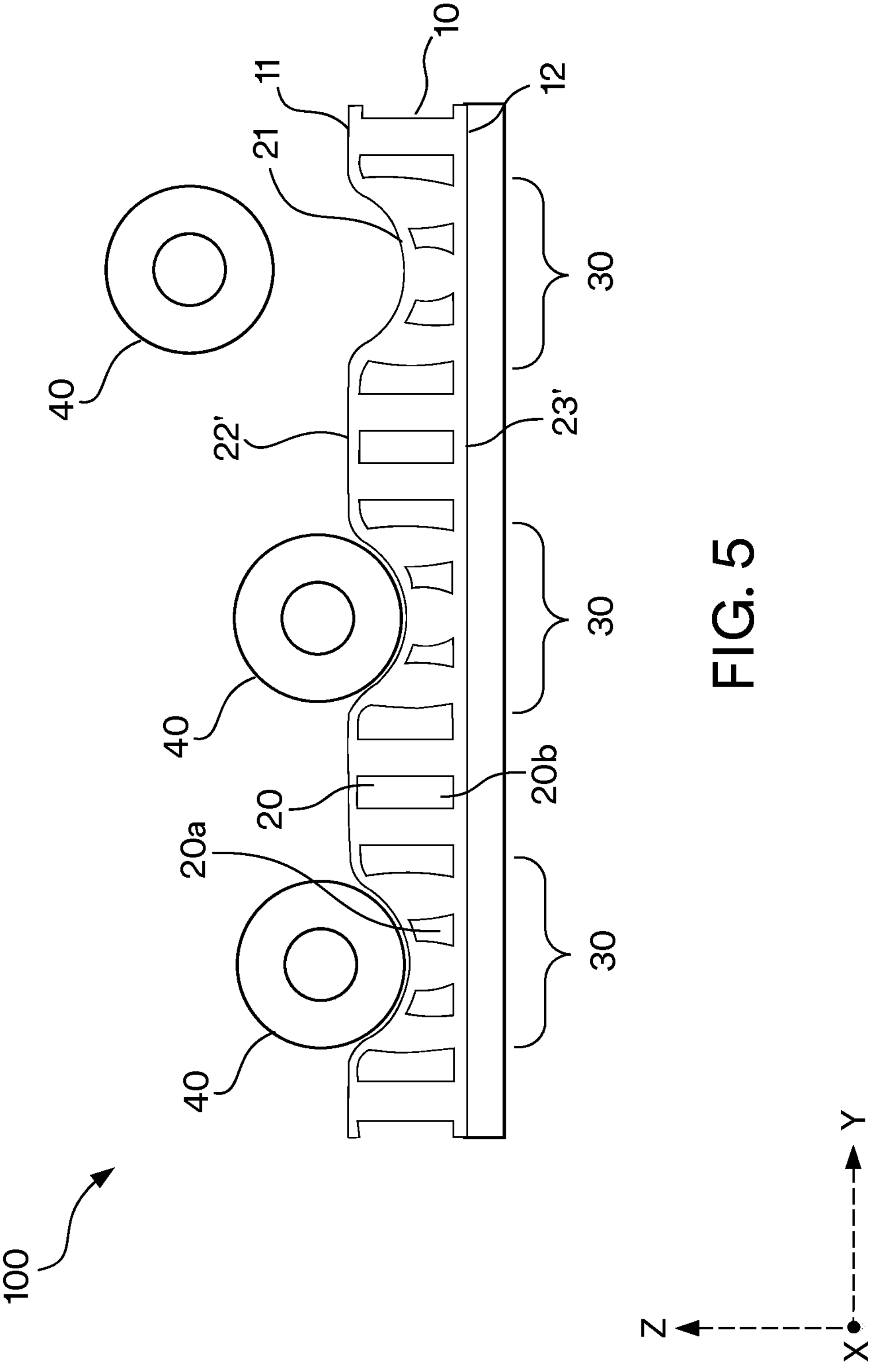
FIG. 5 is a cross-sectional view of a ribbon cable.

FIG. 5 is a cross-sectional view of a ribbon cable in accordance with an alternate embodiment disclosed herein. A ribbon cable 100 includes a first insulative layer 10, and a plurality of spaced apart substantially parallel conductors 40. The first insulative layer 10 extends along a length (e.g., in the x-direction of FIG. 5, extending into the page) and a width (e.g., in the y-direction of FIG. 5) of the cable and includes opposing top 11 and bottom 12 major surfaces, and defines a plurality of spaced apart cavities 20 therein. The spaced apart cavities 20 extend between the top 11 and bottom 12 major surfaces of the first insulative layer 10. In some embodiments, each cavity 20 comprises a top closed end 22' at the top surface 11 of the first insulative layer and a bottom closed end 23' at the bottom surface 12 of the first insulative layer 10.

The top major surface 11 of the first insulative layer 10 is deformed in a plurality of spaced apart substantially parallel regions 30 extending along the length, and arranged along the width, of the ribbon cable 100. Each deformed region 30 has a shape of a groove 130 and is defined by a deformed portion 21 of at least one cavity in the plurality of cavities.

The plurality of spaced apart, substantially parallel conductors 40 extends along the length of the cable, and each conductor is disposed in a corresponding deformed region 30 of the insulative layer 10. Each deformed region 30 includes at least one deformed cavity **20*a*. In some examples, cavities 20*a* within the deformed region 30 may define less volume than cavities 20*b* outside of deformed regions 30. For example, a total volume of a deformed cavity 20*a* may be less than a total volume of an undeformed cavity 20*b* by no more than 70%. In another example, a total volume of a deformed cavity 20*a* may be less than a total volume of an undeformed cavity 20*b*** by no more than 50%.

Figure 6A:
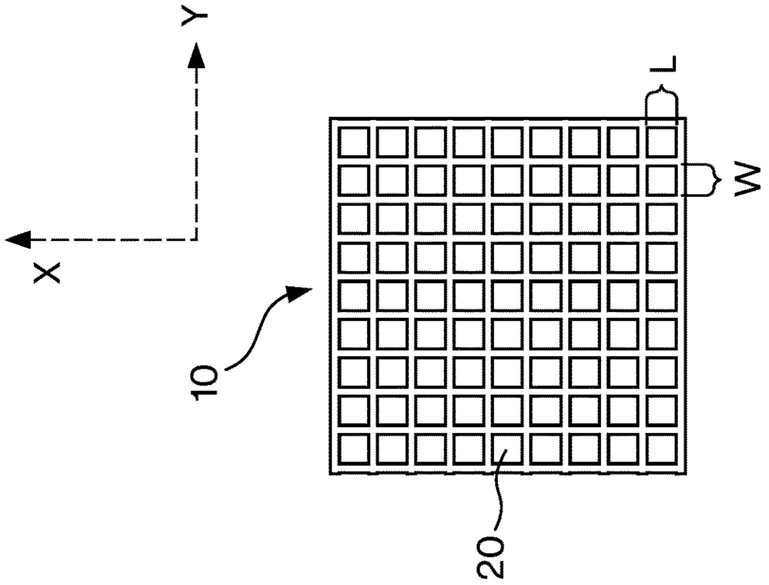
FIGS. 6A-6C are top views of three alternate embodiments of an insulative layer showing variations in cavity dimensions.
Figure 6B:
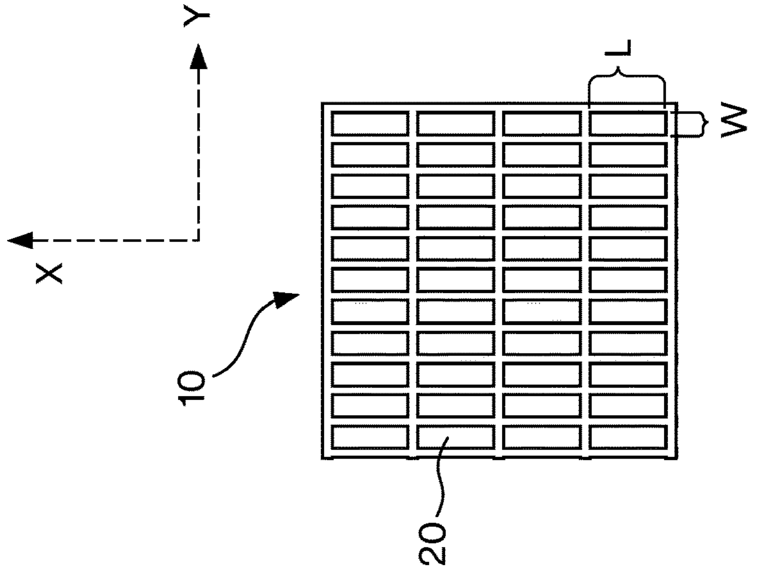
Figure 6C:
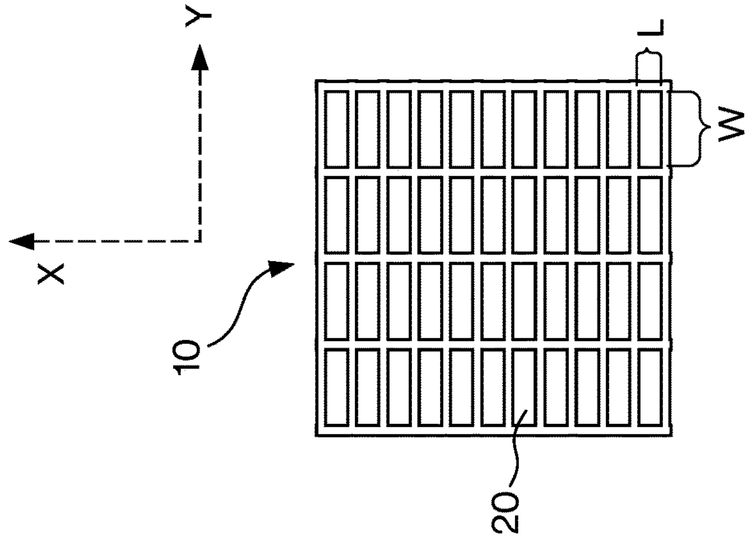
Figure 7A:
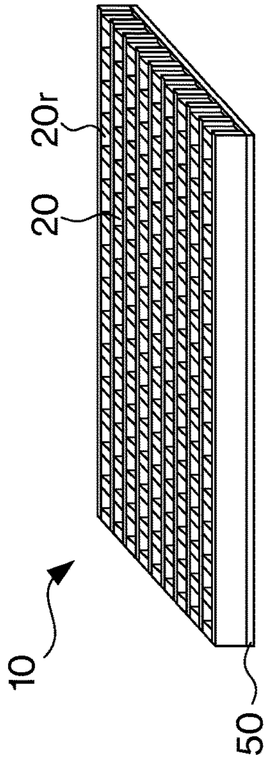
FIGS. 7A-7G are perspective views of embodiments of an insulative layer showing various cavity shapes.
Figure 7B:
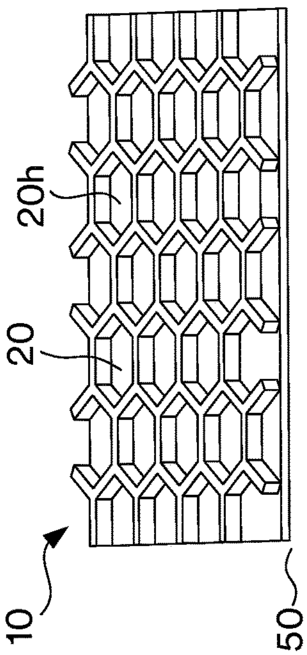
Figure 7C:
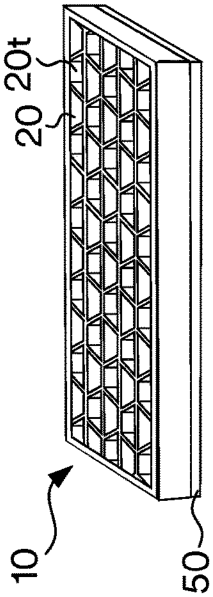
Figure 7D:
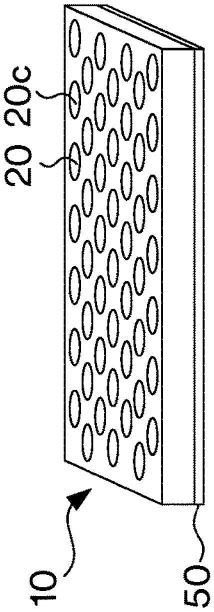
Figure 7E:
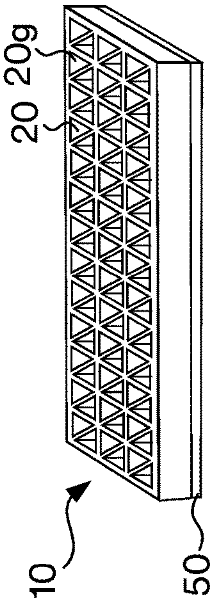
Figure 7F:
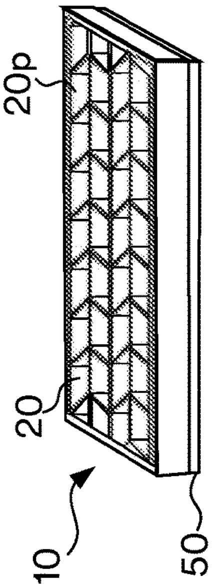
Figure 7G:
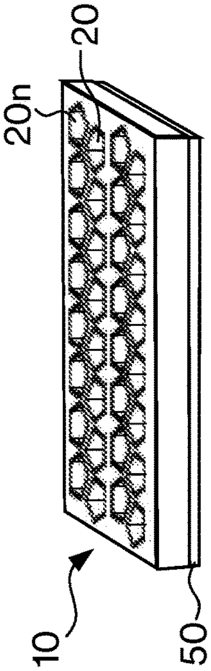

FIGS. 6A-6C are top views of three alternate embodiments of an insulative layer showing variations in cavity dimensions in accordance with embodiments of the present description. FIG. 6A illustrates an embodiment wherein each cavity 20 has a length L along the length of the cable (e.g., in the x-direction of FIGS. 6A-6C) and a width W along the width of the cable (e.g., in the y-direction of FIGS. 6A-6C), such that L and W are substantially equal to each other. FIG. 6B illustrates an alternate embodiment wherein each cavity 20 has a length L along the length of the cable and a width W along the width of the cable, such that L is greater than W. FIG. 6C illustrates an alternate embodiment wherein each cavity has a length L along the length of the cable and a width W along the width of the cable, such that L is less than W. In some embodiments, each cavity has a longest dimension L along the length of the ribbon cable and a longest dimension W along the width of the ribbon cable, where L and W may be substantially equal to each other, L may be greater than W, or L may be less than W. The examples shown in FIGS. 6A-6C are examples only and not intended to be limiting in any way. In addition, the examples of FIGS. 6A-6C show a relatively short section of an insulative layer 10 which may or may not be indicative of the dimensions of an insulative layer 10 used in an actual ribbon cable. For example, the insulative layer 10 of FIG. 6A may extend farther than is shown in the x direction, corresponding to the length of corresponding conductors (not shown) in a ribbon cable. In addition, the cavities 20 shown in the examples of FIGS. 6A-6C are substantially rectangular in shape. However, the cavities may be any appropriate shape or size, as shown in FIGS. 7A-7F.

FIGS. 7A-7G are perspective views of embodiments of an insulative layer showing various cavity shapes in accordance with at least some of the exemplary embodiments disclosed herein. Referring to the example embodiments of FIGS. 7A-7G, cavities 20 in insulative layer 10 provide areas of air within the structure of a ribbon cable constructed using such an insulative layer 10. In some embodiments, the cavities 20 may be open on both the top and bottom. In other embodiments, the cavities 20 may be closed on one or both of the top and bottom sides. In some embodiments, a substrate 50 (e.g., a backing film) may cover a bottom side of the insulative layer 10, covering one end of the cavities 20. In some embodiments, openings in the substrate 50 corresponding to the cavities 20 may allow the end of cavities 20 facing the substrate 50 to remain open. The cavities 20 may be any appropriate size or shape, and may be in any appropriate quantity so as to provide an appropriate amount of air content in the insulative layer 10, while still providing a desired level of structural support for the resulting ribbon cable. For example, in a cross-section of a ribbon cable in a plane parallel to the length and width of the ribbon cable, a shape of the cavities 20 may be one or more of a polygon (any of shapes **20*r*, 20*h*, 20*t*, 20*c*, 20*g*, 20*p*, or 20*n*), square 20*r*, rectangle 20*r*, trapezoid 20*t*, parallelogram 20*p*, pentagon 20*n*, hexagon 20*h*, triangle 20*g*, circle 20*c*, oval 20*c*, and ellipse 20*c***.

Figure 8A:
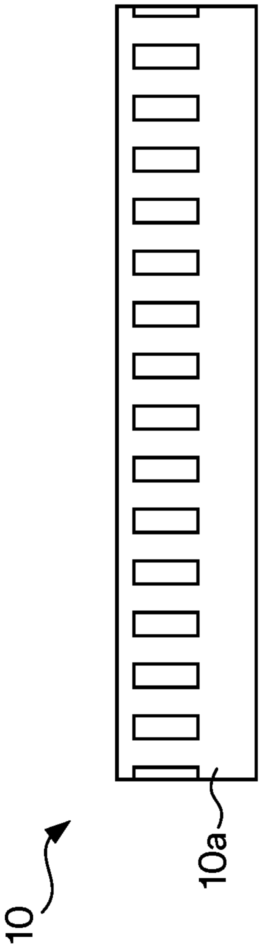
FIGS. 8A-8B show a side view of an insulative layer using a multi-layer and single layer design.
Figure 8B:
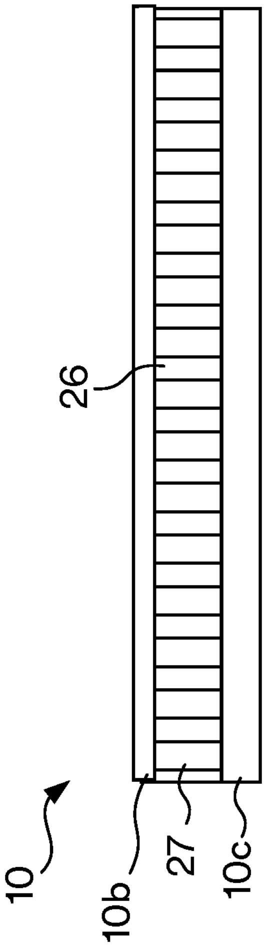

FIGS. 8A-8B show a cross-sectional, side view of an insulative layer using a single layer and multi-layer design, respectively, in accordance with an embodiment of the present disclosure. In the embodiment shown in FIG. 8A, the insulative layer 10 is a unitary construction 10*a*. That is, the entire structure of the insulative layer 10 is a single layer 10*a*, formed at once with a single forming process. In alternate embodiments, such as that shown in FIG. 8B, the insulative layer 10 is a multilayer structure, including two or more components created and combined in multiple processes. For example, insulative layer 10 may be formed by separate components including walls 26, intersecting ribs 27, top layer 10*b*, and bottom layer 10*c*, each of which may be formed in a separate manufacturing process and brought together in a final assembly process. The examples shown in FIGS. 8A and 8B are intended as examples only, and are not limiting in any way. Any appropriate method may be used to create insulative layer 10, including any appropriate number of layers and/or separate components.

Figure 9:
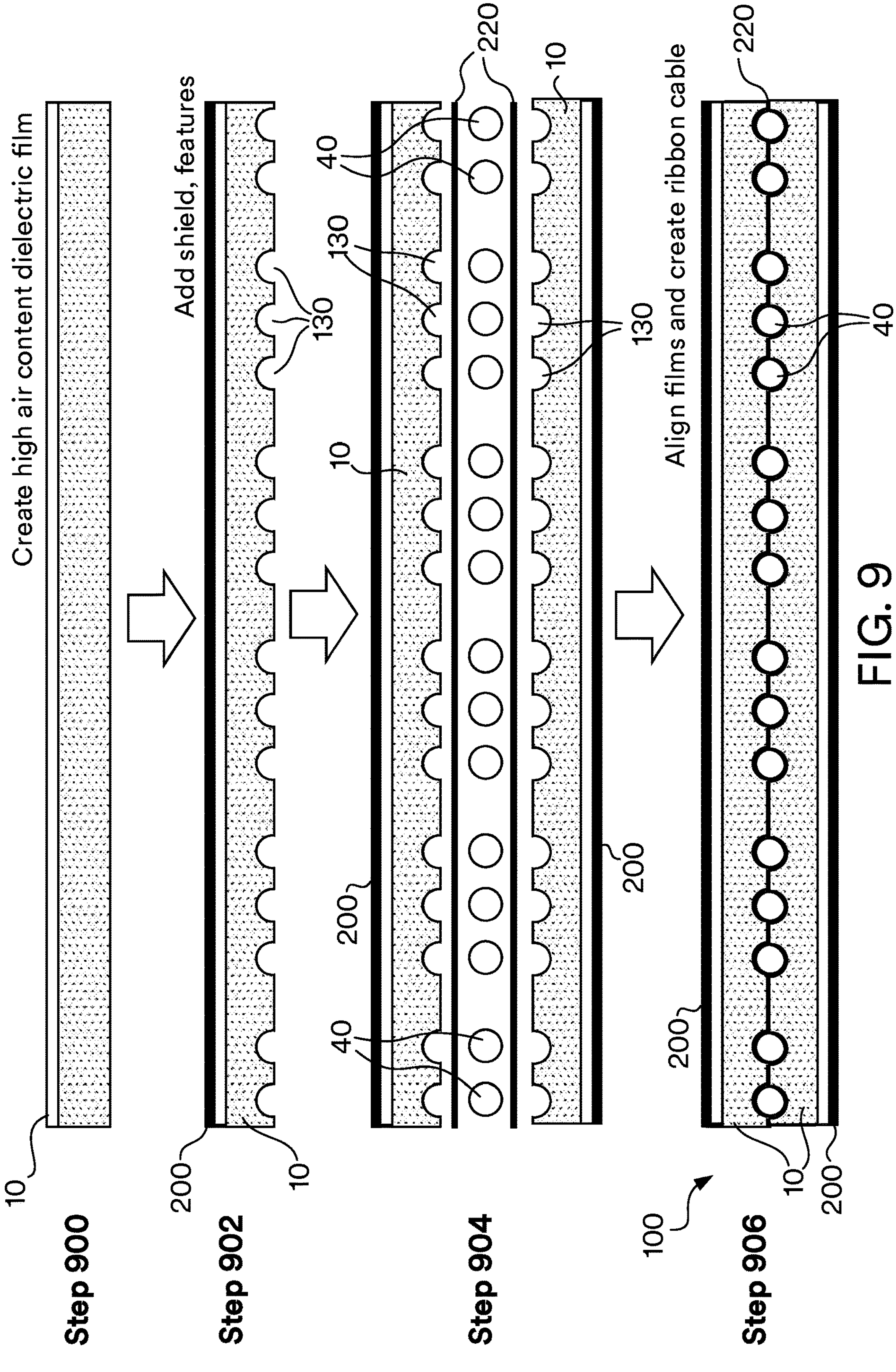
FIG. 9 illustrates a process for creating a ribbon cable.

FIG. 9 illustrates a process for creating a ribbon cable in accordance with an embodiment of the present disclosure. In Step 900, an insulative layer 10 is formed from a high air content dielectric film. As described elsewhere, this insulative layer 10 may be created to have a high air content by manufacturing or otherwise forming cavities in the insulative layer 10 to form air voids to increase the air content and thus lower the dielectric constant of insulative layer 10. In Step 902, features (e.g., grooves 130) are formed in at least one side of insulative layer 10. In some embodiments, these features may be formed by passing insulative layer 10 through patterned rollers which may use machining, embossing, heat forming, or any appropriate method or combination of methods to form the features. In some embodiments, a conductive shield 200 may also be added to the insulative film at Step 902, or in a separate process. In Step 904, two layers of the structured insulative film 10 formed in Step 902 are aligned as top and bottom layers around a set of conductors 40. In some embodiments, one or more adhesive layers 220 may be placed between structured insulative layers 10 to provide bonding for the final ribbon cable 100. In Step 906, the structured insulative layers 10 are pressed together around conductors 40 to form the final ribbon cable 100.

Figure 10:
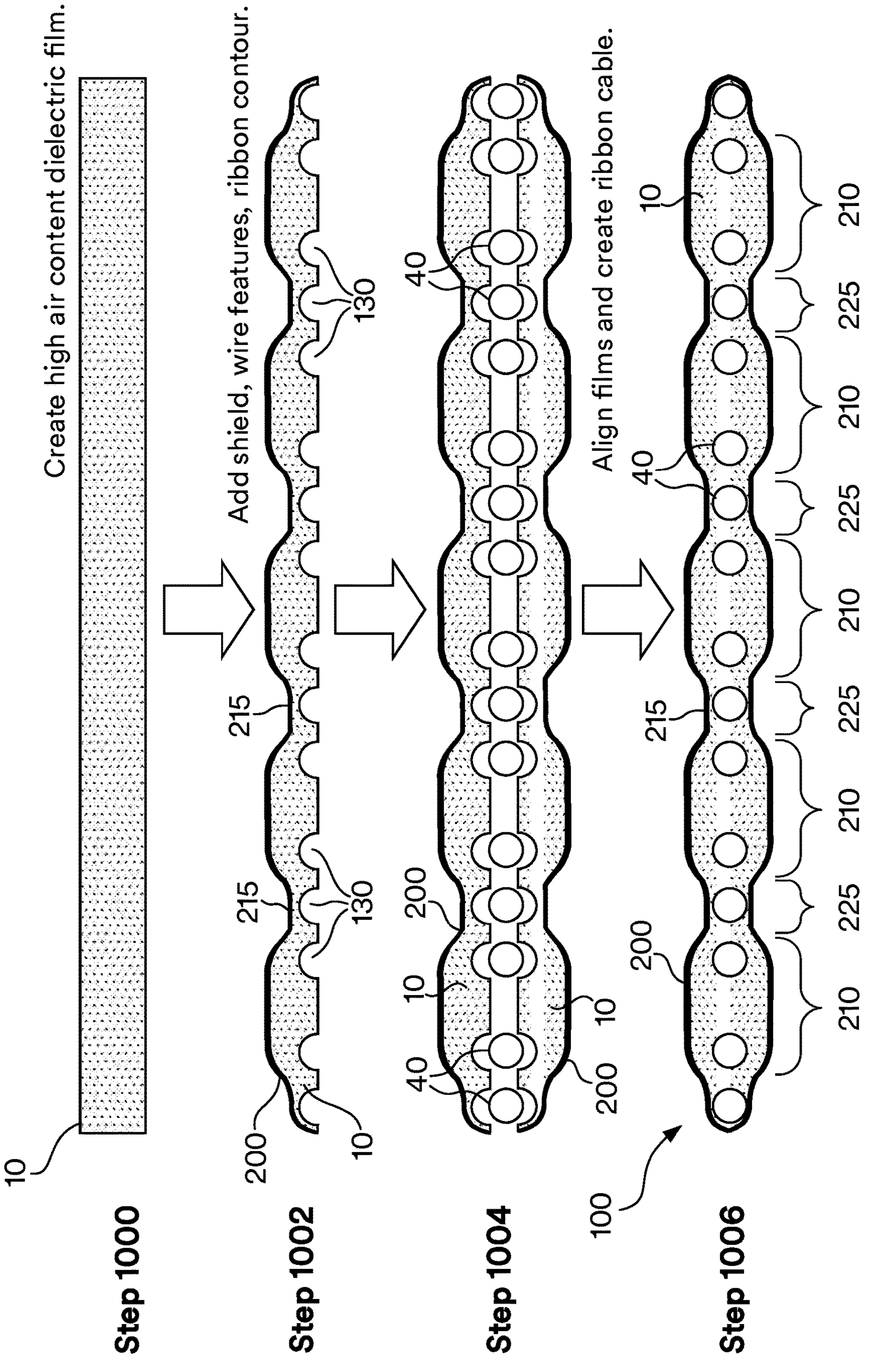
FIG. 10 illustrates a process for creating a contoured ribbon cable.

FIG. 10 illustrates a process for creating a contoured ribbon cable in accordance with at least some of the exemplary embodiments of the present specification. The process of FIG. 10 may be similar to the process shown in FIG. 9. In Step 1000, an insulative layer 10 is formed from a high air content dielectric film. As described elsewhere, this insulative layer 10 may be created to have a high air content by manufacturing or otherwise forming cavities in the insulative layer 10. In Step 1002, features are formed in both sides of insulative layer 10. On a bottom side of insulative layer 10, features such as grooves 130 may be formed to create conductor retention features. On a top side of insulative layer 10, additional features, such as ribbon contours 215 may be formed. In some embodiments, these ribbon contours 215 may be formed to change the thickness of the insulative layer 10 surrounding certain conductors 40, as will be explained in Step 1006. In some embodiments, grooves 130 and ribbon contours 215 may be formed by passing insulative layer 10 through patterned rollers which may use machining, embossing, heat forming, or any appropriate method or combination of methods to form the features. In some embodiments, a conductive shield 200 may also be added to the insulative film at Step 1002, or in a separate process.

In Step 1004, two layers of the contoured, structured insulative film 10 formed in Step 1002 are aligned as top and bottom layers around a set of conductors 40. In Step 1006, the structured insulative layers 10 are pressed together around conductors 40 to form the final ribbon cable 100. The grooves 130 in each of the top and bottom insulative layers 10 are aligned to cradle conductors 40. Ribbon contours 215 of the top and bottom insulative layers 10 are also aligned to create cover portions 210 and pinched portions 225 in the final ribbon cable 100. In some embodiments, the cover portions 210 provide a pocket of low dielectric material surrounding pairs of conductors, and pinched portions 225 allow a reduced amount of dielectric material surrounding other conductors (e.g., a drain or ground wire), and also provide cross-talk isolation between adjacent pairs of conductors in adjacent covered portions 210.

Figure 11A:
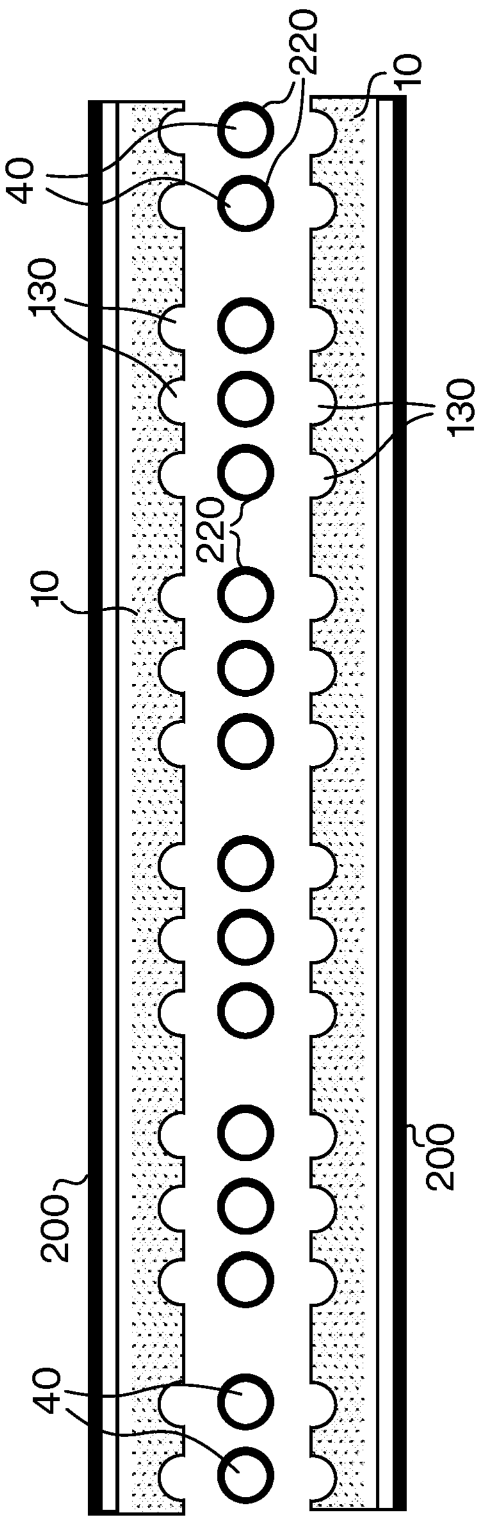
FIGS. 11A-11B illustrate alternate processes for applying an adhesive layer in a ribbon cable.
Figure 11B:
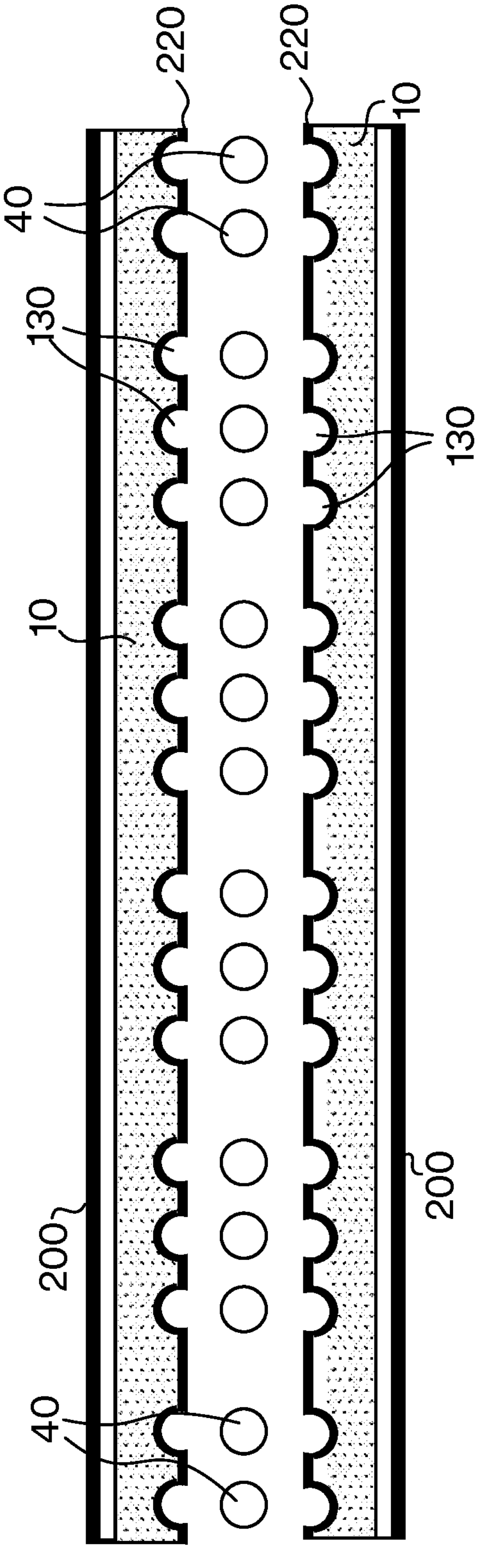

FIGS. 11A-11B illustrate alternate processes for applying an adhesive layer in a ribbon cable in accordance with at least some of the exemplary embodiments of the present disclosure. While FIG. 9 illustrated an example of placing adhesive layers 220 in between the conductors 40 and the top and bottom insulative layers 10, alternate placements are shown in FIGS. 11A-11B. In FIG. 11A, the adhesive 220 is coated onto and around each individual conductor 40 before the layers 10 are pressed together to form the ribbon cable. In FIG. 11B, the adhesive 220 is coated onto the faces of the top and bottom insulative layers 10 facing the conductors 40. The examples shown in FIGS. 11A and 11B are not limiting in any way. Any appropriate process and position may be used for the adhesive 220. In some embodiments, it may not be necessary to use a separate adhesive 220. For example, it may be possible to use thermal bonding techniques to cause the top and bottom layers 10 to adhere to each other and to the conductors without an added adhesive 220.

Figure 12:
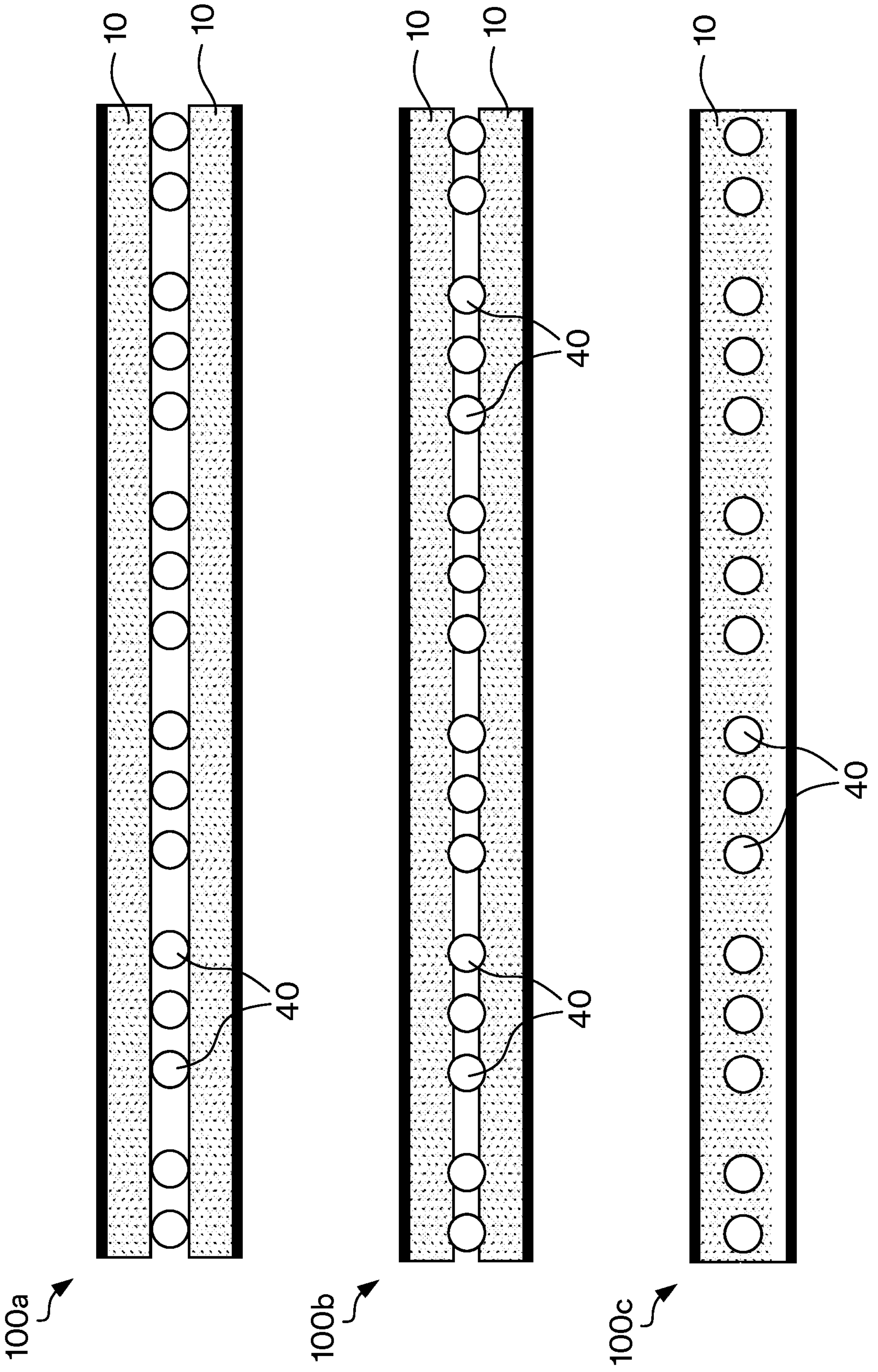
FIG. 12 shows alternate embodiments of a ribbon cable with varying amounts of air gap within the construction.

Finally, FIG. 12 shows alternate embodiments of a ribbon cable with varying amounts of air gap within the construction, in accordance with at least some of the embodiments disclosed herein. In embodiment 100*a*, conductors 40 make contact with top and bottom insulative layers 10 but little to no deformation is created in the surfaces of the layers 10 contacting the conductors. This allows for a construction with an increased amount of air content within the cable 100*a*, creating a lower effective dielectric constant for the ribbon cable 100*a*. In embodiment 100*b*, top and bottom insulative layers 10 have a small amount of deformation, allowing the top and bottom layers 10 to be brought closer together around conductors 40. In embodiment 100*c*, the air gap between the top and bottom insulative layers 10 is eliminated entirely. Various amounts of air gap can be left between the top and bottom insulative layers 10 as required to create a ribbon cable 100 with the desired effective dielectric constant.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A ribbon cable, comprising:

a first insulative layer extending along a length and a width of the ribbon cable and comprising opposing top and bottom major surfaces and defining a plurality of spaced apart cavities therein extending between the top and bottom major surfaces of the first insulative layer, the top major surface of the first insulative layer deformed in a plurality of spaced apart substantially parallel regions extending along the length, and arranged along the width, of the ribbon cable, each deformed region having a shape of a groove and comprising a deformed portion of at least one cavity in the plurality of spaced apart cavities; and a plurality of spaced apart substantially parallel conductors extending along the length of the ribbon cable, each conductor disposed in a corresponding deformed region of the first insulative layer, wherein the plurality of spaced apart cavities is independent of the plurality of substantially parallel regions and forms a regular two-dimensional array of cavities arranged along the length and width of the first insulative layer.

2. The ribbon cable of claim 1, wherein each cavity comprises a top open end at the top major surface of the first insulative layer and a bottom open end at the bottom major surface of the first insulative layer.

3. The ribbon cable of claim 1, wherein each cavity comprises a top closed end at the top major surface of the first insulative layer and a bottom closed end at the bottom major surface of the first insulative layer.

4. The ribbon cable of claim 1, wherein the first insulative layer is a single layer.

5. The ribbon cable of claim 1, wherein the first insulative layer is a multilayer.

6. The ribbon cable of claim 1, wherein the first insulative layer is a unitary construction.

7. The ribbon cable of claim 1, wherein a total volume of a deformed cavity is less than a total volume of an undeformed cavity by no more than 70%.

8. The ribbon cable of claim 1, wherein each deformed region comprises a deformed portion of a sidewall of at least one cavity in the plurality of spaced apart cavities.

9. The ribbon cable of claim 1, wherein each cavity comprises at least one wall substantially parallel to the length or width of the ribbon cable.

10. The ribbon cable of claim 1, wherein each cavity comprises at least one wall oblique relative to the length or width of the ribbon cable.

11. The ribbon cable of claim 1, wherein at least one groove extends deeper into the first insulative layer and at least one other groove extends shallower into the first insulative layer.

12. The ribbon cable of claim 1, further comprising a second insulative layer disposed on and substantially coextensive with the first insulative layer and comprising opposing top and bottom major surfaces, the bottom major surface of the second insulative layer facing the top major surface of the first insulative layer, the second insulative layer defining a plurality of spaced apart cavities therein extending between the top and bottom major surfaces of the second insulative layer, the bottom major surface of the second insulative layer deformed in a plurality of spaced apart substantially parallel regions extending along the length, and arranged along the width, of the ribbon cable, corresponding deformed regions of the first and second insulative layers aligned and registered with each other, each deformed region of the second insulative layer having a shape of a groove and comprising a deformed portion of at least one cavity in the plurality of spaced apart cavities; and each conductor in the plurality of spaced apart substantially parallel conductors disposed in corresponding deformed regions of the first and second insulative layers.

13. The ribbon cable of claim 12, further comprising an adhesive disposed between and bonding the first insulative layer to the second insulative layer.

14. The ribbon cable of claim 13, wherein the adhesive is applied around at least one conductor in the plurality of spaced apart substantially parallel conductors.

15. The ribbon cable of claim 1, wherein the first insulative layer has an air content of greater than about 40% by volume.

16. The ribbon cable of claim 1, wherein the first insulative layer has a dielectric constant less than about 1.7.

17. The ribbon cable of claim 12, further comprising an air gap between the first and second insulative layers.

18. A ribbon cable comprising:

an insulative layer extending along a length and a width of the ribbon cable and comprising:

a first regular structure formed in a top major surface of the insulative layer and extending along the length and width of the ribbon cable; and a plurality of spaced apart substantially parallel grooves formed in the top major surface by deforming at least portions of the first regular structure; and a plurality of uninsulated conductors, each uninsulated conductor disposed in a corresponding groove in the plurality of grooves, wherein the first regular structure is independent of the plurality of spaced apart substantially parallel grooves and forms a regular two-dimensional array of cavities arranged along the length and width of the first insulative layer.

* * * * *